(12) United States Patent
Huxel et al.

(10) Patent No.: US 7,895,940 B2
(45) Date of Patent: Mar. 1, 2011

(54) EDIBLE CONTAINER APPARATUS AND METHOD OF MANUFACTURE

(75) Inventors: Edward T. Huxel, Ft. Worth, TX (US); Thomas A. Lehmann, Manhattan, KS (US)

(73) Assignee: Conics Foods, Inc., New York, NY (US)

( * ) Notice: Subject to any disclaimer, the term of this patent is extended or adjusted under 35 U.S.C. 154(b) by 1025 days.

(21) Appl. No.: 11/158,427

(22) Filed: Jun. 22, 2005

(65) Prior Publication Data
US 2006/0292276 A1 Dec. 28, 2006

(51) Int. Cl.
*A21D 6/00* (2006.01)
(52) U.S. Cl. ......................................................... 99/426
(58) Field of Classification Search ...... 99/450.1–450.8, 99/352–356, 426, 428, 432, 439, 485; 249/120–122; 425/398, 348 R, 351, 358, 346; 426/505
See application file for complete search history.

(56) References Cited

U.S. PATENT DOCUMENTS

| | | | | |
|---|---|---|---|---|
| 2,191,921 A * | 2/1940 | Ziringer | .......................... | 249/76 |
| 2,233,064 A * | 2/1941 | Stutzner | .......................... | 99/439 |
| 3,296,956 A * | 1/1967 | Turner | .......................... | 99/439 |
| 3,431,869 A * | 3/1969 | Frank | .......................... | 425/290 |
| 3,590,728 A * | 7/1971 | Stanley | .......................... | 99/439 |
| 4,066,797 A * | 1/1978 | McNair | .......................... | 426/307 |
| 4,205,091 A | 5/1980 | Van Horne | | |
| 5,191,830 A * | 3/1993 | Jacobson | .......................... | 99/439 |
| 5,246,721 A * | 9/1993 | Kerkonian | .......................... | 426/279 |
| 5,336,511 A * | 8/1994 | Der Beek | .......................... | 426/138 |
| 5,425,527 A * | 6/1995 | Selbak | .......................... | 249/122 |
| 5,518,748 A | 5/1996 | Ito | | |
| 5,626,897 A | 5/1997 | Goldstein | | |
| 5,895,668 A * | 4/1999 | Willett | .......................... | 425/148 |
| 6,847,106 B1 * | 1/2005 | Howard et al. | .......................... | 257/687 |
| 6,973,872 B2 * | 12/2005 | Morgan | .......................... | 99/439 |

* cited by examiner

*Primary Examiner* — Geoffrey S Evans
*Assistant Examiner* — Thien Tran
(74) *Attorney, Agent, or Firm* — DLA Piper LLP (US)

(57) ABSTRACT

A method and apparatus are provided for forming and baking an edible cone-shaped container, the container being of a bread dough provided with a light, flaky texture by the inclusion of solid flaked fat pieces in the dough mixture and the cone formed by an initial forming and cooking step followed by multiple baking steps.

6 Claims, 7 Drawing Sheets

EDIBLE CONTAINER APPARATUS AND METHOD OF MANUFACTURE

FIELD OF THE INVENTION

The present invention generally relates edible containers and methods of making edible containers. Specifically, the present invention provides for a conical shaped edible container which may be used for creating bread-like dough containers for holding foodstuffs.

BACKGROUND OF THE INVENTION

The manufacture and use of edible containers generally has long been known in the art. For hundreds of years, people have wrapped food in edible flat breads which serve to contain and transport the foodstuffs contained therein and also served as a container from which the food could be eaten along with the container. Another such long-known edible container is the elongate bread loaf or French bread loaf which may be hollowed out and filled with a selection of foodstuffs. The resilient bread crust serves to protect the food contained therein and serve as a means for transporting the food, as well as means for serving the food which can be eaten along with the food. The advantage of the French bread loaf container is the provision of a resilient outer surface which lends itself to transporting the foodstuff contained therein. Yet another long-known edible container is the sweet batter cone or ice cream cone which may be made from a rolled up crepe-type or flat pancake-type starting structure or which may be made by an injection mold which receives batter therein, the mold being heated to solidify the batter into the shape of a cone.

Three types of edible containers have more recently been developed and are shown in U.S. Pat. No. 4,205,091 to Van Horne and U.S. Pat. No. 5,518,748 to Ito and U.S. Pat. No. 5,626,897 to Goldstein.

The Van Horne structure is a series of cup-shaped receptacles which are sized for placement within the human mouth and having bridges joining the adjacent receptacles. This permits the cup-shaped receptacles to be filled with fluid foodstuffs and serially inserted into the mouth while the individual can break the bridges joining adjacent receptacles with the teeth to allow each individual cup-shaped receptacle to be eaten.

In the patent to Ito, an edible container, and the method of manufacturing the container, are shown. In Ito a generally cylindrical container is prepared by wrapping a sheet of edible dough around a mandrel to form a cylinder. The lower edge of the sheet of dough is provided with a scalloped edge comprising adjacent parabolic pieces of dough which are folded inwardly to overlap and create the bottom of the cylinder.

In the patent to Goldstein, a conical food article is provided which is formed by wrapping a strip of dough about a conical mandrel. The elongate strip is of uncooked bread dough which is then baked while in contact with the mandrel to cook the dough and provide a solid bread cone, the interior of which may be filled with foodstuffs. The edible food container of Goldstein, however, is not provided with any utilitarian means of commercial manufacture and teaches only a method of individually spirally wrapping the dough strip about the mandrel. The sealing of the various edges created by the wrapping of the dough strip around the mandrel is compensated for by the use of cornstarch to assist to gluing or cementing the wrapped cone together. Goldstein teaches that it is useful to apply some pressure while wrapping the dough strip around the mandrel and that sufficient tension must be applied to the dough strip as it is wound so that there are no gaps in the structure.

The conical food article of Goldstein, therefore, presents a number of problems in manufacture and in the resulting product which are undesirable in a food container. The potential for the bottom of the cone to be improperly sealed and allow the leakage of foodstuff therefrom and the potential for the seams of the overlapping portions of the strip of dough to be improperly joined, thus creating gaps which can leak foodstuffs is a problem that should be avoided in any food container.

The present invention avoids these limitations and drawbacks of the Goldstein container while providing an apparatus for the manufacturer of a substantial number of cones that can be applied to a commercial process.

Further, a dough mixture is provided which is particularly suited to the cone-forming apparatus, and which through its particular consistency and other dough characteristics permit successful formation of the conical edible container with the inventive apparatus.

Therefore it is an object of the present invention to provide an apparatus for forming an edible cone-shaped food container that provides for unitary construction of the cone-shaped food container.

It is another object of the invention to provide an edible food container which avoids the presence of connection lines or required points of closure between the structural components forming the cone-structure such as at the vertex of the cone or joints created by overlapping strips of material.

It is another object of the invention to provide an edible cone-shaped food container that is made of a bread dough rather than an unleavened cracker-like substance and which provides the consumer with the texture and taste of a bread product.

SUMMARY OF THE INVENTION

These objects and other benefits are achieved in a cone forming apparatus generally comprising a heated conical mandrel which is insertable within a conical mold to provide an initial partial shaping into conical form of a dough bolus contained within the conical mold. The apparatus further comprising a conical baking insert form insertable within the cone mold and spaced apart therefrom to provide an interstice into which the baking dough may expand for formation of the cone shaped edible container.

The invention further comprises a method of forming a cone shaped edible container comprising inserting a bolus of dough into a cone shaped mold and performing a partial cone shape by insertion of a cone shaped mandrel into the cone mold with heating of the mandrel for partial solidification of the dough into a partial cone shape followed by baking of the partially formed cone within a confining shape to direct the expansion of the baking dough into a cone-shaped edible container.

DESCRIPTION OF THE PREFERRED EMBODIMENT

Figure 1:
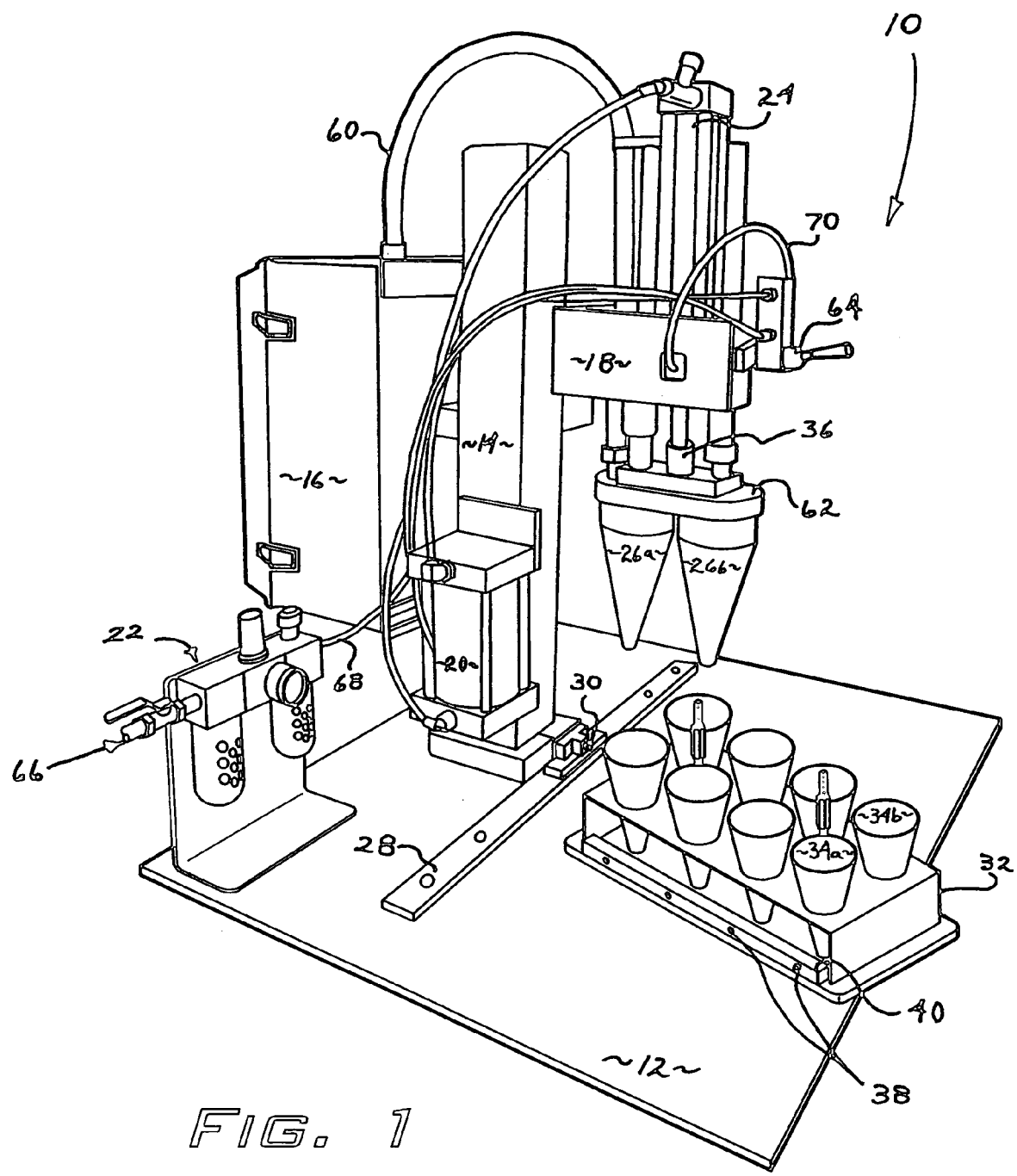
FIG. 1 is a left side elevation view of the inventive apparatus showing the cone forming mandrels supported on a drive cylinder with a set of cone molds adjacent the pair of cone forming mandrels.
Figure 8:
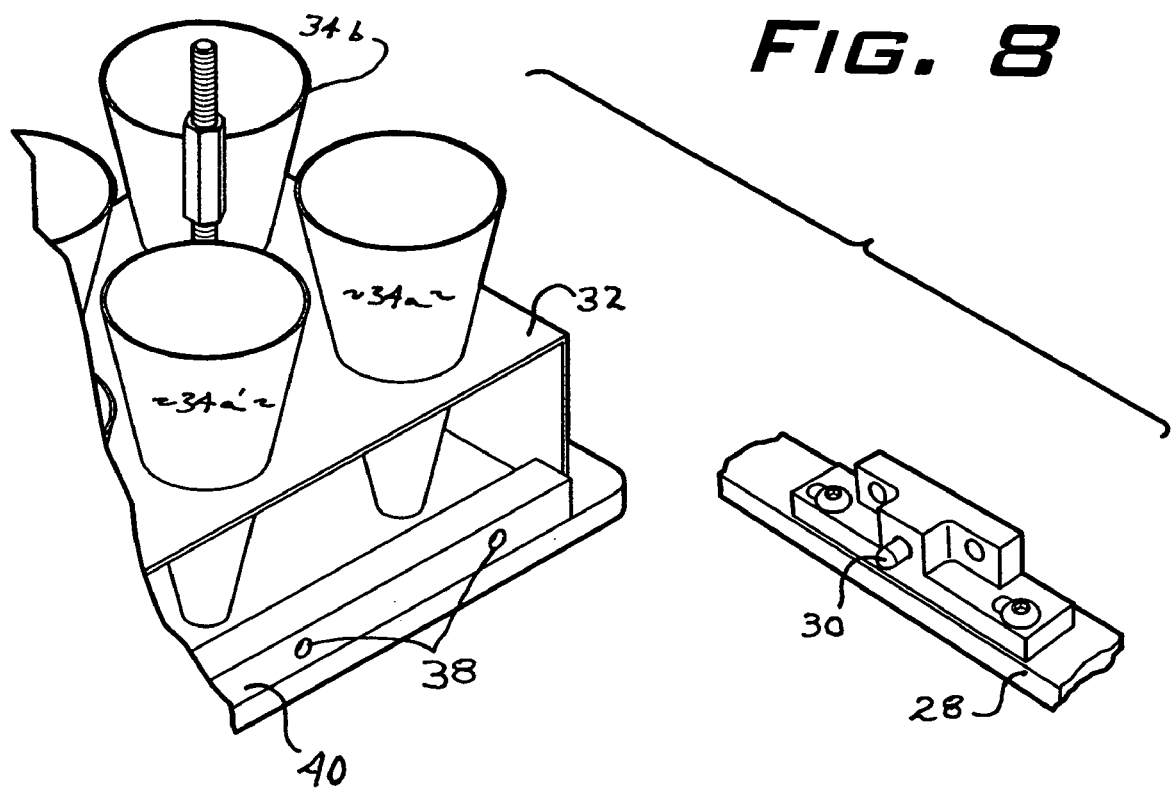
FIG. 8 is a rear fragmentary view of a cone rack having cone molds fixed therein and showing the rack registration bar along the rear of the cone mold rack having registration holes therein for capturing the registration pin beneath the cone mandrels to align the cone molds with the mandrels during the initial forming procedure.

First referring to FIG. 1, cone forming apparatus 10 is shown which is comprised of a base plate 12 having vertical support 14 extending upwardly therefrom. Attached to vertical support 14 are electronics control box 16, drive support 18 and reservoir 20. Also mounted on base plate 12 is air regulator unit 22 which supplies compressed air to drive cylinder 24 which extends and retracts mandrels 26a, 26b. Also attached to base 12 is guide bar 28 having registration pin 30 mounted thereon. During operation, as will be described in detail hereinafter, registration pin 30 permits alignment of cone mold rack 32 beneath mandrels 26a, 26b to insure a properly aligned insertion of mandrels 26a, 26b into cone molds 34a, 34b during the process of the initial forming of the conical, edible food container with the present invention. Shown in FIG. 8 is a detail of registration pin 30 mounted on side bar 28 and registration voids 38 positioned along registration bar 40 of cone mold rack 32.

Still referring to FIG. 1, apparatus 10 will be further described. Cone forming apparatus 10, in a preferred embodiment, makes use of compressed air to operate a hydraulic cylinder to drive mandrels 26a, 26b in a reciprocating manner along a vertical axis. An electric control unit 16 houses the power control apparatus for heating elements contained within mandrels 26a, 26b and which are powered by power cable 60 connected between electronics control box 16 and mandrel mounting plate 62. In electric control unit 16 are thermostats to control the temperature of mandrels 26a, 26b. As described hereinafter, mandrels 26a, 26b are heated to a temperature between about 200° F. and about 250° F. to provide the initial cooking of the dough during the shape formation process. The thermostats turn the power on and off the heating elements within 26a, 26b to thereby maintain the user selected temperature of 26a, 26b depending on the type of dough being used in the device. In a manual version of apparatus 10, a toggle switch 64 is provided to switch drive cylinder 24 between extending mandrels 26a, 26b downwardly and retracting mandrels 26a, 26b upwardly. A pressurized air supply is supplied to apparatus 10 by hose 66 which enters air regulator unit 22. Air supply line 68 transmits pressurized air to toggle valve 64. The air is communicated to the bottom of drive cylinder 24 by line 70.

Referring now to FIGS. 1-5, the operation of the cone-forming apparatus of FIG. 1 will be described, and the initial steps of forming a cone of bread dough within cone molds 34a, 34b will be described. Again referring to FIG. 1, it will be appreciated that mandrels 26a, 26b are provided with a reciprocating motion along a vertical axis established by hydraulic cylinder 24 which is connected to mandrels 26a, 26b by drive shaft 36. A more detailed description of the mechanics of the operation of hydraulic cylinder 24 will be contained hereinafter, however, it is initially sufficient to identify the reciprocating motion of vertical drive 36 shaft having mandrels 26a, 26b attached thereto and which reciprocating motion is provided by hydraulic cylinder 24. In the formation of a cone-shaped bread product within cone molds 34a, 34b a ball or bolus of unformed dough is initially placed into the bottom of each of cone molds 34a, 34b and successive cone molds contained in a cone mold rack 32 which also may be described as cone pairs 34a, 34b followed by cone pairs 34a', 34b', etc. Such a bolus of dough is shown within cone molds 34a, 34b in FIG. 4. The precise amount of dough placed in each cone mold 34a, 34b will vary with the size of cone mold which is used. Typically, the bolus of dough used in a preferred embodiment of the present invention weighs between 45 and 100 grams. A bolus of dough of approximately 50 grams will provide a cone of approximately 6-7 inches in height and having a top diameter of about 3 inches and a wall thickness of three (3) to five (5) millimeters. Those skilled in the art will determine a satisfactory amount of dough for the particular size of cone mold used in the forming operation.

Figure 4:
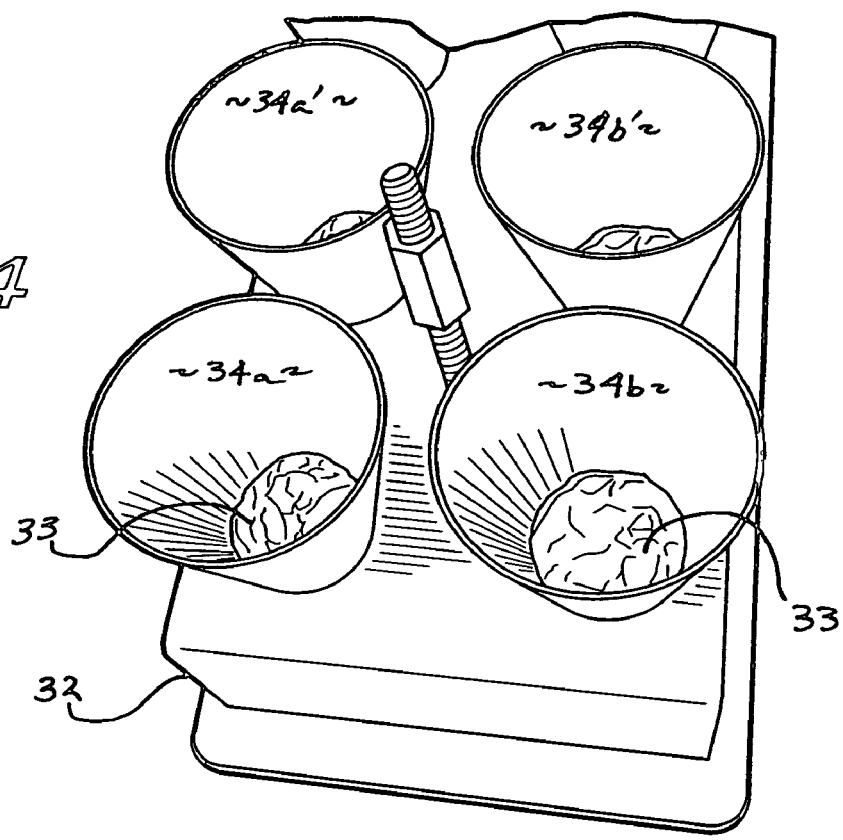
FIG. 4 is a top and left side perspective view showing an unformed bolus of dough within the cone molds.
Figure 5:
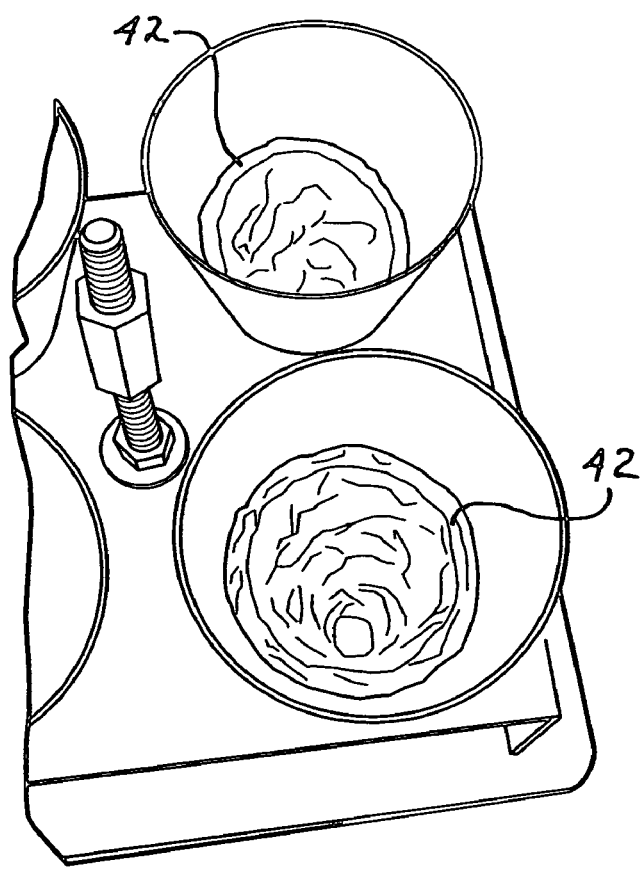
FIG. 5 shows the partially formed cone within molds created by the insertion of the heated mandrel into the cone molds.

Once a bolus of dough has been placed into cone molds 34a, 34b as shown in FIG. 4, cone mold rack 32 is then positioned on base 12 of cone forming apparatus as shown in FIG. 1. Once cone mold rack 32 is on base plate 12, it is necessary to properly position cone mold rack 32 underneath mandrels 26a, 26b so that accurate insertion of mandrels 26a, 26b into cone molds 34a, 34b is accomplished. This accurate registration of cone mold rack 32 beneath mandrels 26a, 26b is provided by the use of registration pin 30 which is mounted on guide bar 28 attached to base 12. Registration pin 30 is positioned orthogonally to the vertical axis which passes through the apex of mandrels 26a, 26b. Registration pin 30 is positioned such that registration voids 38 in registration bar 40 of cone mold rack 32 can receive registration pin 30 within registration voids 38. Once pin 30 is inserted into void 38, cone molds 34a, 34b are aligned directly underneath mandrels 26a, 26b and may receive the mandrels precisely within cones 34a, 34b thereby providing equal spacing and wall thickness of the cone that will be formed from dough bolus 33 placed in cone 34a, 34b.

Figure 2:
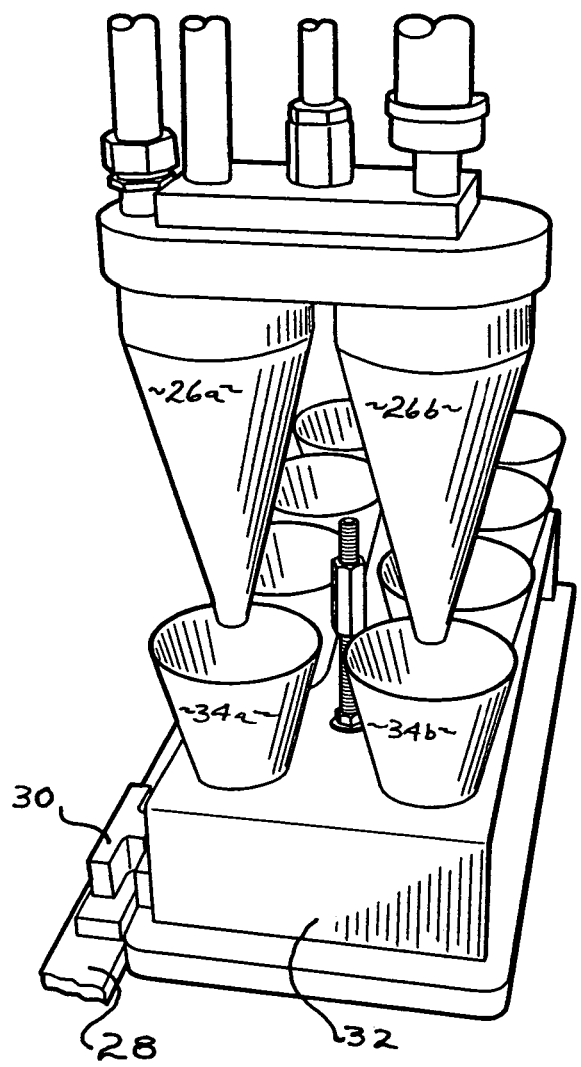
FIG. 2 is a left side elevation perspective view of a pair mandrels position above a pair of cone molds.
Figure 3:
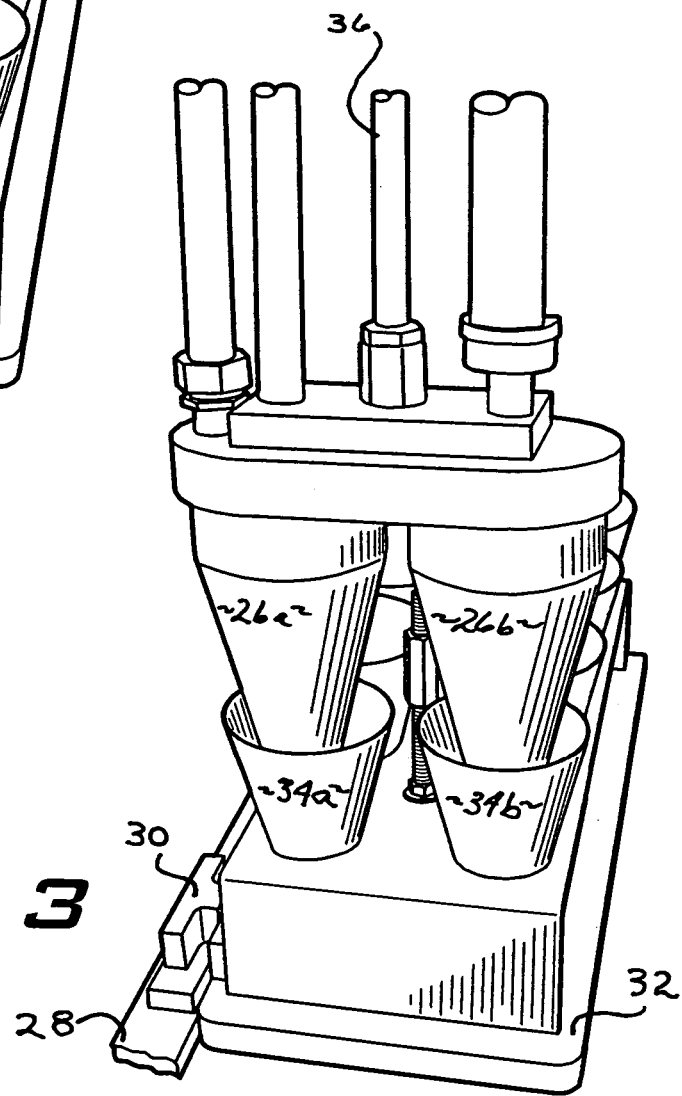
FIG. 3 shows the mandrels of FIG. 2 partially inserted into the cone molds of FIG. 2.

Referring now to FIGS. 2 and 3, the alignment achieved by the insertion of registration pin 30 into registration voids 38 (FIG. 1). It is essential that mandrels 26a, 26b are completely centered on cone molds 34a, 34b. If mandrels 26a, 26b are misaligned with respect to cone molds 34a, 34b mandrels 26a, 26b will not create an equal amount of dough thickness or wall thickness in the initial dough shape formation and then, during the subsequent baking and expansion of the cone the sidewalls of the cone will not be evenly shaped and are likely to be lopsided and overly thick on one side and overly thin on the other side. The process of insertion of mandrels 26a, 26b into cone molds 34a, 34b now will be described. After generally uniform dough boluses 33 (FIG. 4) have been placed into cone molds 34a, 34b and cone mold rack 32 has been positioned underneath mandrels 26a, 26b by the insertion of registration pin 30 into a selected registration void 38, the forming process of the dough bolus into the initial cone shaped end product can be started. The formation of the dough bolus 33 into a cone is initiated by first heating mandrels 26a, 26b to an effective temperature for partially cooking the dough bolus 33 as it is pressed into a cone shape by the insertion of mandrels 26a, 26b into cone molds 34a, 34b. As previously stated an effective temperature for mandrels 26a, 26b is in the range of 200° F. and about 250° F. The object is to slightly cook the dough to allow the dough to be easily removed from mandrels 26a, 26b at the end of this initial shape forming stage and to provide sufficient cooking of the dough to allow the dough to retain its partially formed shape upon withdrawal of mandrels 26a, 26b from cone molds 34a, 34b.

Once mandrels 26a, 26b have reached the desired temperature, the mandrels 26a, 26b are inserted into cone molds 34a, 34b by activation of cylinder 24. The activation of cylinder 24 causes mandrels 26a, 26b to descend into cone molds 34a, 34b and to contact dough bolus 33 previously placed in the bottoms of molds 34a, 34b. As mandrels 26a, 26b descend into cone mold 34a, 34b, the vertex of mandrels 26a, 26b impact dough bolus 33 and compress the dough bolus and force it outwardly and upwardly around mandrels 26a, 26b to provide a layer of dough between mandrels 26a, 26b and cone molds 34a, 34b. This entry of mandrels 26a, 26b into cone molds 34a, 34b initiates the formation of a hollow cone shape from dough bolus 33. At the furthest extent of the downward motion of mandrels 26a, 26b provided by cylinder 24, the vertex of mandrels 26a, 26b will be spaced apart from the vertex of cone molds 34a, 34b. This spacing allows the proper dough thickness to be achieved between the vertices of cone mold 34a, 34b and mandrel 26a, 26b The spacing also provides a sufficient gap for the dough to rise upwardly between the cone sidewalls of cone mold 34a, 34b and cone sidewalls of mandrel 26a, 26b as mandrel 26a, 26b is inserted into cone mold 34a, 34b.

While mandrel 26a, 26b is inserted into cone mold 34a, 34b, the heat from mandrels 26a, 26b is allowed to partially cook the dough to set the shape of the dough within cone mold 34a, 34b and to create a partially cook the surface of the bread cone which abuts mandrel 26a, 26b. This partial cooking of the dough allows a clean release of dough 33 from mandrel 26a, 26b upon removal of mandrels 26a, 26b from cone molds 34a, 34b. The contact of mandrels 26a, 26b with dough 33 is approximately four seconds at a temperature of greater than 200 degrees Fahrenheit and less than 350 degrees Fahrenheit. Once the four second cooking time of dough 33 by mandrels 26a, 26b has been achieved, the mandrels are withdrawn from cone molds 34a, 34b. Cone mold rack 32 then is withdrawn from registration pin 30 and shifted sideways until the next registration void 38 is aligned with registration pin 30 at which time mold rack 32 is seated against registration pin 30. This movement positions the next set of cone molds 34a, 34b underneath mandrels 26a, 26b to allow insertion of the mandrels in the cone molds to achieve the initial conical formation of dough ball or bolus 33 which has previously been placed into the cone molds.

After the initial forming process using mandrels 26a, 26b has been accomplished and all cone molds 34a, 34b have received mandrels 26a, 26b therein to initially form dough bolus 33 into the basic conical shape, the partially formed dough cones within cone molds 34a, 34b are ready for final baking and shaping. The next step of the cone-forming procedure will be described with reference to FIGS. 6 and 7.

It will be appreciated by those skilled in the art that the previous description of a manually operated preferred embodiment of the present invention can be automated by the use of step-movement conveyors to shift the various sets of cone molds 34a, 34b underneath mandrels 26a, 26b to allow insertion of the mandrels in the cone molds to achieve the initial conical formation of dough ball or bolus 33. Timers can be used to achieve the proper insertion time of mandrels 26a, 26b into cone molds 34a, 34b. Also, multiple pairs of mandrels 26a, 26b can be affixed to the shaft of drive cylinder 24 to effect higher production efficiency.

Figure 6:
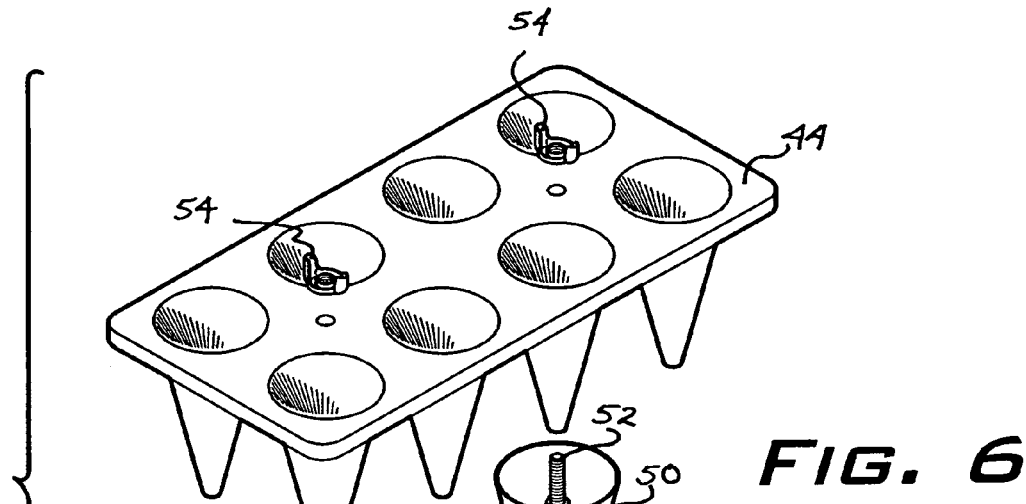
FIG. 6 is an exploded view of a set of cone molds within a cone mold rack and showing the cone baking insert positioned above the cone molds and positioned for insertion into the cone molds after the dough has been partially formed within the cone molds by the pressure of the mandrel.

In FIG. 6, cone mold rack 32 is shown after the process of partial cone formation by the insertion of mandrels 26a, 26b into cone molds 34a, 34b. Partially formed cones 42 are shown in phantom lines within cone molds 34a, 34b of cone mold rack 32. Also shown in FIG. 6 is baking insert form 44 positioned above cone mold rack 32 in preparation for insertion of baking insert form 44 into mold rack 32. It will be appreciated that for convenience of reference of the relationship of the structures that baking insert form 44 may be typified as a "male" structure adapted for insertion in to the "female" structure of the cone mold rack 32. The insertion of baking insert form 44 into mold rack 32 containing the partially formed cones 42 is necessary to provide a guide for the expansion of the dough of partially formed cones 42 during the baking process. During baking partially formed cones 42 will continue to expand and to rise within cone molds 34a, 34. It is necessary that the proper wall spacing be provided to direct the rising and expansion of the dough and to create the final product. This proper spacing is accomplished by the use of baking insert form 44 which establishes a sized void 46 or interstice 46 which serves to confine the dough expansion and to direct the dough into the final cone shape.

Figure 7:
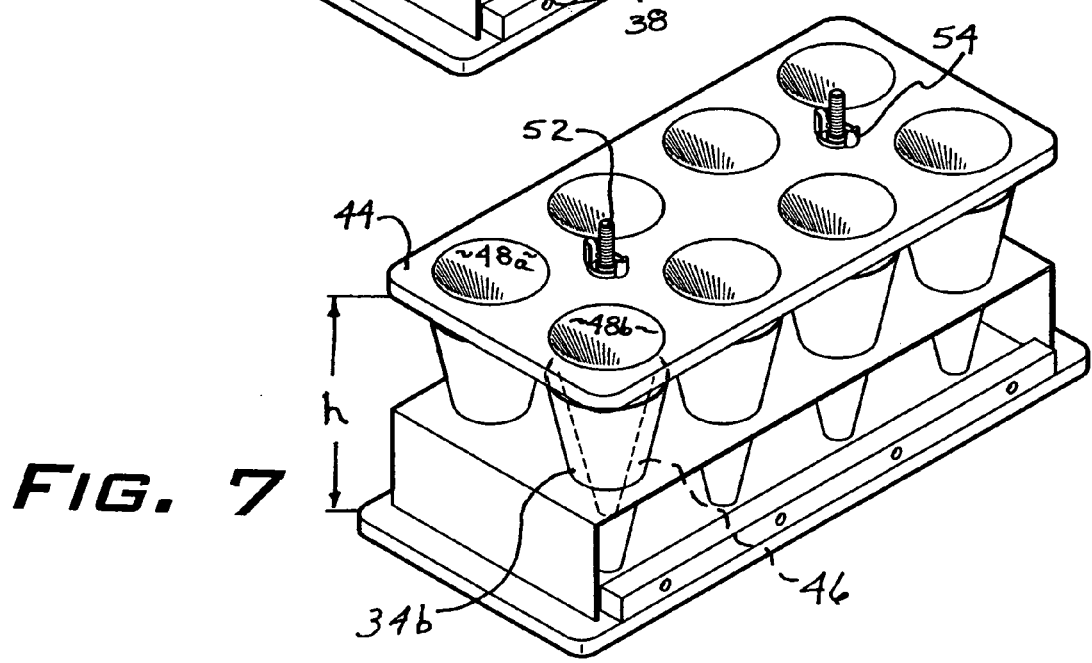
FIG. 7 shows the cone insert unit positioned into the cone molds and wing nuts securing the cone insert in position.

Referring now to FIG. 7, the interstice 46 is shown which is created by the insertion of baking insert form 44 into cone mold rack 32 which causes insertion of insert cone 48b into cone mold 34b such that baking insert form 44 is sufficiently spaced from cone mold rack 32 to provide interstice 46. The spacing of baking insert form 44 from cone mold rack 32 is achieved by proper position of standoff 50 along the vertical height of threaded standoff support 52. It will be evident to those skilled in the art that the position of standoff 50 on stand off support 52 will dictate the height of baking insert form 44 above cone mold rack 32 and the amount of interstice 46 that is provided between insert cone 48b and cone mold 34b. Once the proper height of standoff 50 on standoff support 52 is established to provide the desired cone thickness, standoff 50 is not adjusted but left in the desired location to support baking insert form 44 at the proper height above cone mold rack 32. During the baking process, wing nuts 54 are secured onto standoff support 52 to prevent the expanding dough from moving baking insert form 44 out of position. In this manner wing nuts 54 serve as a male form limiting means and provide an upper terminus to the movement of the male form upwardly and away from the female form during the expansion of the expanding dough during baking. This limiting means forces the expanding dough to move into interstice 46 instead of pushing away baking insert form 44 from cone mold rack 32 and forming a shorter, thicker walled cone. In a preferred embodiment standoff 50 is positioned on support 52 so that distance "h" between cone mold rack 32 and the edge of baking insert form 44 is approximately seven and one fourth (7 ¼) inches. This distance will, and can be, varied according to the tastes of the user and the size of the cones being manufactured.

After insertion of baking insert form 44 into cone mold rack 32, baking is conducted at approximately 450° F. for approximately fourteen to twenty minutes. Baking time and temperature are dependent upon the cone wall thickness that is to be provided as a result of the sizing of interstice 46 that is created by the spacing of baking insert form 44 from cone mold rack 32. During baking, the rise of the dough will be approximately two and one-half inches (2.5) of height. This rise takes place within interstice 46 created between cone mold 43*a*, 43*b* and insert cone 48*a*, 48*b*. As will be discussed hereinafter in more detail, when the dough used in the present invention is described, use of the flaked shortening within the dough is critical to give the final baked cone product an open structure and bread likeness of weight, feel and taste and to thereby avoid the heavy particulate pressed-out appearance, feel and taste of other types of shaped dough products.

It should further be appreciated that during the baking process, as the dough heats, there is a loss of air and moisture from the dough. This loss of air and moisture from the dough causes a general loss of mass from the dough that is contained within the cone mold 34*a*, 34*b* and allows insert cone 48*a*, *b* to sink further into cone mold 34*a*, *b*. This additional descent of insert cone 48*a*, *b* into cone mold 34*a*,*b* will also be dependent upon the weight of baking insert form 44. The heavier the material baking insert form 44 is constructed from, the greater pressure that will be provided against the dough contained in cone mold 34*a*,*b* during the baking process. While ultimately the downward descent of baking insert form 44 is limited by standoff 50, it will be appreciated that a baking insert 44 constructed of a material having little weight will be detrimental to the baking process of the bread cones being formed within the inventive apparatus. Therefore, constructing baking insert 44 out of a material such as aluminum which provides a sufficient weight to provide a beneficial downward force is a utility in the present invention. While very lightweight materials are used in modern baking, these materials, without augmentation, may not provide sufficient downward force to urge the bread dough within cone mold 34*a*,*b* upwardly during the baking process.

Figure 10:
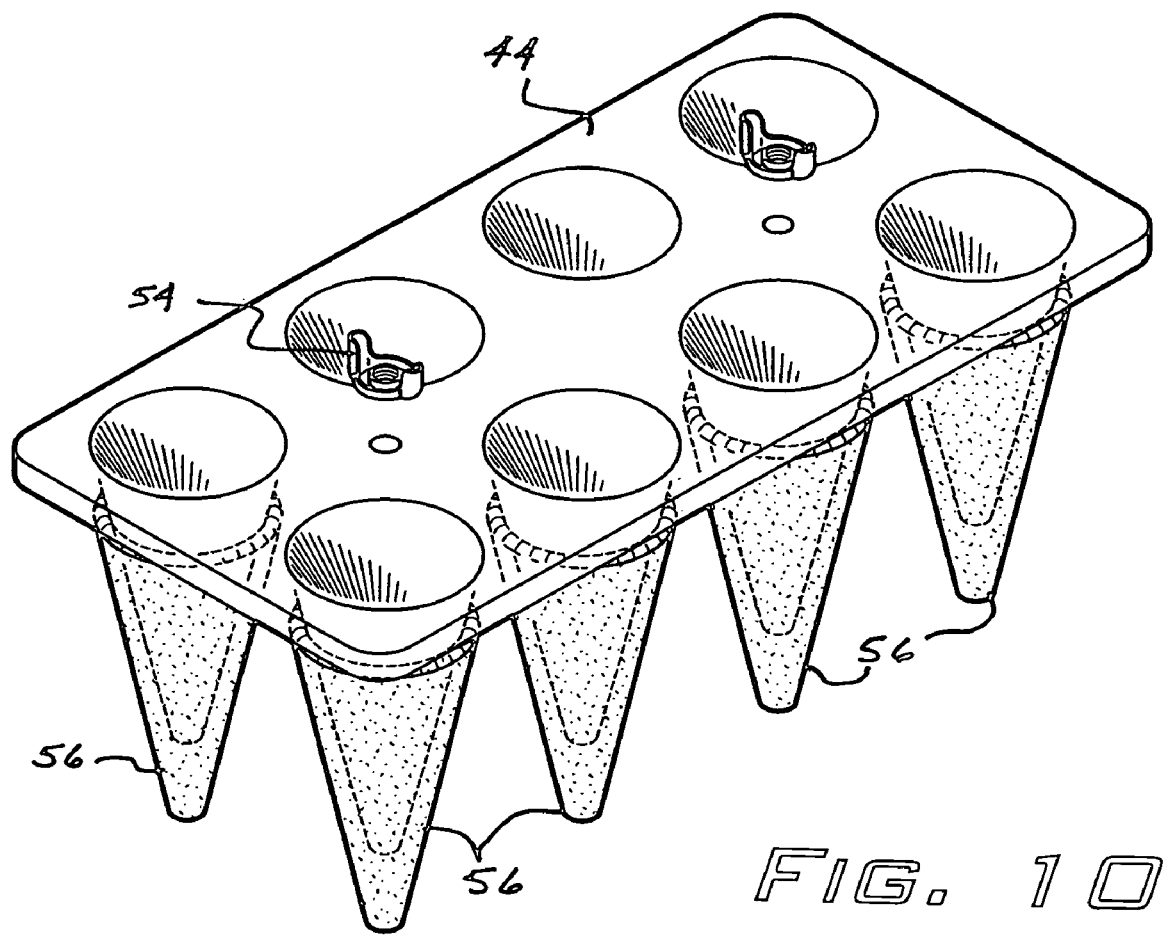
FIG. 10 shows the final baked product, cone 56 adhered to baking insert form 44.

Referring now to FIG. 10, the final baked product cone 56 is shown in FIG. 10 after wing nuts 54 have been removed from standoff support 52 allowing removal of baking insert form 44 from cone mold rack 32. Upon separation of baking insert form 44 from cone mold rack 32 the baked cone adheres to baking insert form 44. As is shown in FIG. 10, at the conclusion of baking, the dough bolus 33 (FIG. 4) has been formed into a cone shape and has risen within cone mold 34*a*,*b* to near the upper edge of the cone mold. At the conclusion of the initial baking process which provides for the expansion of the dough into baked cone 56, the cone 56 which is still adhered to cone mold rack 32 may be reinserted into an over for a final baking stage. The final baking is for about 3 minutes at about 450° F. In this final baking stage the outside of the cone 56 receives a browning and crisping of the cone and which final baking stage provides the final cone product 56 with a satisfying toasted exterior appearance and crisp crunch texture.

Several preferred embodiments of dough have been developed for use with the inventive method and apparatus. A bread dough formula and a Masa dough formula and a dough containing bacon bits are shown in Tables 1, 2 and 3. An important component of each dough formula is the inclusion of solid flaked fat pieces which become mixed in the dough during blending. The solid flaked fat pieces are transformed during baking and result in a light, flakey dough that possesses a "bread" texture and mouth feel and avoids presenting the consumer with a product that has the appearance and mouth feel of a pressed or molded cone product.

TABLE 1

Bread Dough

| Ingredient | Grams |
|---|---|
| Flour (bread) | 1000 |
| Salt | 17.5 |
| Sugar | 30 |
| Yeast (Compressed) | 15 |
| Fat Flakes | 150 |
| Oil | 30 |
| Water | 600 (75° F.) |

TABLE 2

Masa Dough

| Ingredient | Grams |
|---|---|
| Flour (bread) | 700 |
| Maseca | 300 |
| Salt | 17.5 |
| Sugar | 30 |
| Yeast (Compressed) | 15 |
| Fat Flakes | 150 |
| Oil | 30 |
| Water | 600 (75° F.) |

TABLE 3

Bacon Dough

| Ingredient | Grams |
|---|---|
| Flour (bread) | 1000 |
| Bacon Bits | 100 |
| Salt | 17.5 |
| Sugar | 30 |
| Yeast (Compressed) | 15 |
| Fat Flakes | 150 |
| Oil | None |
| Water | 600 (75° F.) |

Figure 9:
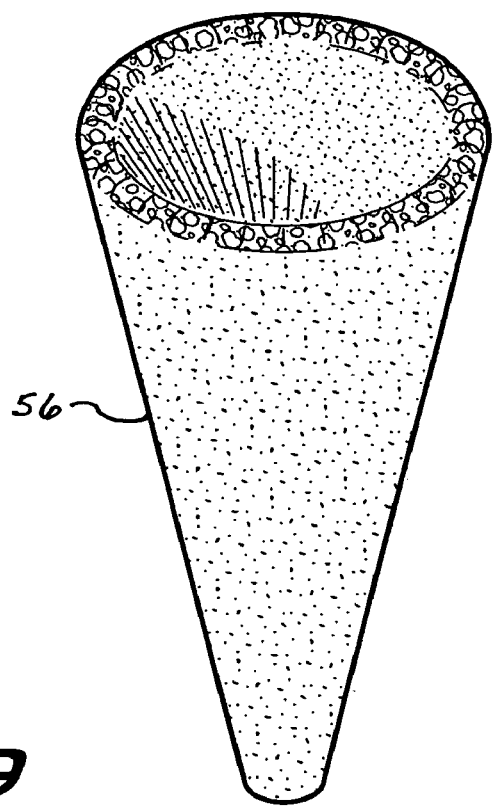
FIG. 9 shows the final product of a cone-shaped edible food container.

In FIG. 9 the finish bread cone edible container is shown after separation from the baking devices. This rustic "bread" mouth and appearance is achieved as the solid flaked fat, when baked, melts and releases water vapor as steam. The melting of the flaked fat presents an air pocket in the dough where the sold flake previously existed and the evolution of the steam causes expansion of the air pocket thereby increasing the lightness and flakiness of the cone product prepared from the dough formula.

Figure 11:
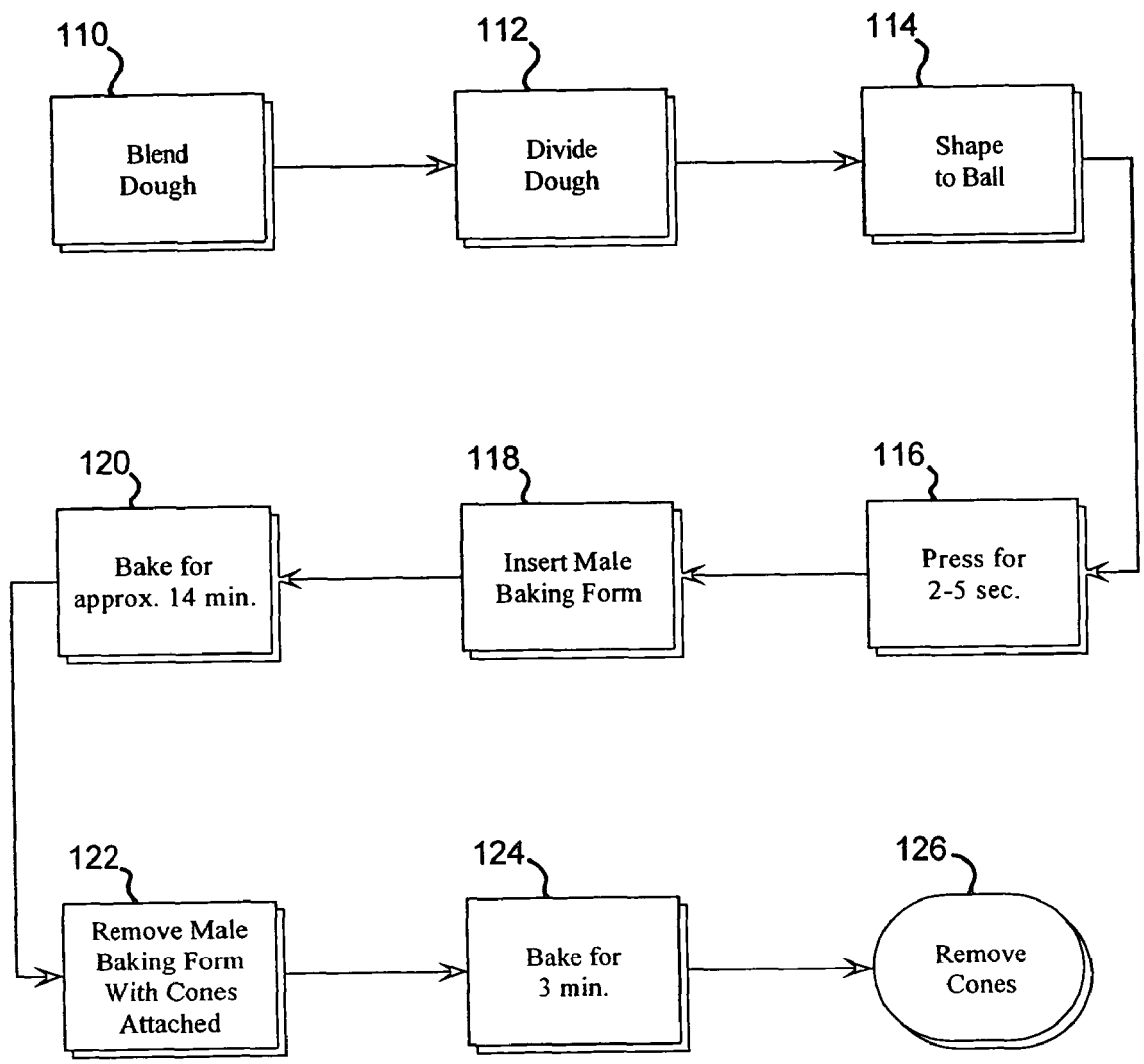
FIG. 11 shows the general scheme of the method of product preparation.

In FIG. 11 a general scheme of the method of product preparation is shown. In step 110 the bread dough formula of Table 1 or Table 21 or Table 3 is blended together. In step 112 the formed dough is divided into generally equal boluses of about 50 grams weight. In step 114 the dough bolus is shaped into a ball which is then inserted into cone molds 34*a*, 34*b*. Mandrels 26*a*, 26*b* are then inserted into cone molds 34*a*, 34*b* during step 118 and the dough bolus is partially formed and slightly cooked. In step 120 baking insert form 44 is inserted into cone mold rack 32 and secured into place. The dough then receives the first baking cycle in step 120 and is baked for approximately 14 to 20 minutes at 450° F. After the initial baking, baking insert form 44 is removed from cone mold rack 32 and the now formed and baked cones adhere to baking insert form 44 in step 122. The cones, still on baking insert form 44 are then baked again in step 124 for about 3 minutes at 450° F. to brown and crisp the cones.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive method and apparatus for providing an edible container are constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is new and desire to be secured by Letters Patent is as follows:

1. An apparatus for forming an edible cone-shaped bread product from a bolus of dough prior to cooking, the apparatus comprising:
    a female baking form assembly for receiving one or more boluses of dough therein, said female assembly comprising a linear array of one or more rows of cone-shaped female baking forms, and defining at least one pin opening at a base portion of said assembly corresponding to each of said one or more rows;
    a mandrel assembly comprising one or more rows of cone-shaped mandrels mounted on a movable shaft, said shaft providing vertical displacement of said mandrel assembly, said mandrels for insertion into said female baking form assembly to urge the dough boluses into a conical shape,
    a registration pin indirectly attached to a base of a vertical support and positioned relative to the base portion of the female baking form assembly for engaging said at least one pin opening, said registration pin being complimentary in both size and shape to each pin opening in the female baking form assembly such that engaging the registration pin in a pin opening aligns at least one female baking form directly beneath a mandrel;
    a heating unit connected to said mandrel assembly to sufficiently heat each mandrel to provide a partial cooking of each said conically shaped dough bolus upon said mandrel's contacting said dough bolus,
    a vertically repositionable male baking form assembly comprising a linear array of one or more rows of cone-shaped male baking forms for insertion into said conically shaped dough boluses within said female form assembly upon removal of said mandrels therefrom, said male form assembly being user selectably spaced from said female form assembly to provide a user selected sized interstice into which said conically shaped dough boluses expand during baking to provide a user selected cone thickness in response to the expansion of said dough bolus into said user selected size interstice during baking,
    said vertical support extending upwardly from said female baking form assembly for insertion of said male baking form assembly thereon for a user selectable positioning of said male baking form assembly along said vertical support to provide said user selected sizing of said sized interstice and to register said male baking form with said female baking form; and
    a standoff repositionably mounted on said support to provide said user selectable positioning of said male baking form along said support to establish said user selected size interstice.

2. The apparatus as claimed in claim 1 wherein said mandrel is heated to a temperature of approximately 200° F.

3. The apparatus as claimed in claim 1 further comprising a nut for attachment to said vertical support to provide an upper terminus to the movement of said male form upwardly from said female form during the expansion of said conically shaped dough bolus during baking.

4. The apparatus as claimed in claim 1 further comprising a hydraulic cylinder attached to said movable shaft to provide vertical displacement of said mandrel.

5. The apparatus as claimed in claim 1 further comprising a thermostat for selecting and maintaining the temperature of said heating unit.

6. The apparatus as claimed in claim 1 further comprising a timer to regulate the duration said mandrel is in direct contact with said dough bolus.

* * * * *